US011887418B2

(12) United States Patent
Yang

(10) Patent No.: US 11,887,418 B2
(45) Date of Patent: Jan. 30, 2024

(54) DEVICE FINGERPRINT-BASED ACCESS METHOD

(71) Applicant: COLORADO SCHOOL OF MINES, Golden, CO (US)

(72) Inventor: Dejun Yang, Golden, CO (US)

(73) Assignee: COLORADO SCHOOL OF MINES, Golden, CO (US)

(*) Notice: Subject to any disclaimer, the term of this patent is extended or adjusted under 35 U.S.C. 154(b) by 0 days.

(21) Appl. No.: 17/498,435

(22) Filed: Oct. 11, 2021

(65) Prior Publication Data

US 2022/0114849 A1 Apr. 14, 2022

Related U.S. Application Data

(60) Provisional application No. 63/091,738, filed on Oct. 14, 2020.

(51) Int. Cl.
*G07C 9/00* (2020.01)
*G07C 9/20* (2020.01)

(52) U.S. Cl.
CPC ........... *G07C 9/00309* (2013.01); *G07C 9/20* (2020.01); *G07C 2009/00555* (2013.01)

(58) Field of Classification Search
CPC .............................. G07C 9/00; G07C 2009/00
See application file for complete search history.

(56) References Cited

U.S. PATENT DOCUMENTS 10,109,166 B1 * 10/2018 Selinger ............... G08B 27/005
11,205,018 B2 * 12/2021 Acun ...................... G06F 21/73

OTHER PUBLICATIONS

Das , et al., Exploring Ways to Mitigate Sensor-Based Smartphone Fingerprinting, 2015.

* cited by examiner

*Primary Examiner* — Daniell L Negron
(74) *Attorney, Agent, or Firm* — Dorsey & Whitney LLP

(57) ABSTRACT

Methods and systems of providing enhanced security to an access-controlled area are disclosed herein. In one implementation a user device generates a signal from which features are extracted to generate a device fingerprint. The features of the signal may be rare, or in some cases unique, to a particular user device such that the use of user device with a known device fingerprint may thwart a relay attack on the access-controlled area. The features of the signal may be related to manufacturing variations between user devices, even devices of the same model. The variations may be related to variations in an electro-mechanical structure of a motion sensor between two user devices. The variations in the electro-mechanical structure may cause variations in a capacitance sensed by the motion sensor. Features of the signal may be analyzed in the frequency or time domains to generate the device fingerprint.

17 Claims, 8 Drawing Sheets

600

TEMPORAL AND SPECTRAL FEATURES

| # | Domain | Feature | Description |
|---|---|---|---|
| 1 | Time | Mean | The arithmetic mean of the signal strength at different timestamps |
| 2 | | Standard Deviation | Standard deviation of the signal strength |
| 3 | | Skewness | Measure of asymmetry about mean |
| 4 | | Kurtosis | Measure of the flatness or spikiness of a distribution |
| 5 | | RMS | Square root of the arithmetic mean of the squares of the signal strength at various timestamps |
| 6 | | Max | Maximum signal strength |
| 7 | | Min | Minimum signal strength |
| 8 | | ZCR | The rate at which the signal changes sign from positive to negative or back |
| 9 | | Non-Negative count | Number of non-negative values |
| 10 | Frequency | Spectral Centroid | The center of mass of a spectral power distribution |
| 11 | | Spectral Spread | The dispersion of the spectrum around its centroid |
| 12 | | Spectral Skewness | The coefficient of skewness of a spectrum |
| 13 | | Spectral Kurtosis | Measure of the flatness or spikiness of a distribution relative to a normal distribution |
| 14 | | Spectral Flatness | Measures how energy is spread across the spectrum |
| 15 | | Spectral Irregularity | The degree of variation of the successive peaks of a spectrum |
| 16 | | Spectral Entropy | The peaks of a spectrum and their locations |
| 17 | | Spectral Rolloff | The frequency below which 85% of the distribution magnitude is concentrated |
| 18 | | Spectral Brightness | Amount of spectral energy corresponding to frequencies higher than a given cut-off threshold |
| 19 | | Spectral RMS | Square root of the arithmetic mean of the squares of the signal strength at various frequencies |
| 20 | | Spectral Roughness | Average of all the dissonance between all possible pairs of peaks in a spectrum |

FIG. 6

DEVICE FINGERPRINT-BASED ACCESS METHOD

CROSS-REFERENCE TO RELATED APPLICATIONS

This application claims the benefit of priority of U.S. Provisional Application No. 63/091,738, filed Oct. 14, 2020, entitled "Device Fingerprint-Based Access Method," which is hereby incorporated herein by reference in its entirety.

BACKGROUND

Smart keys allow people to use an access credential without reaching for their keys in pockets, purses, briefcases, or the like. Smart keys transmit and receive wireless signals to communicate with an access-controlled area to allow a person with the key to access the access-controlled area. For example, a user of a smart car key can unlock and even start their car without handling a key. Unfortunately, current smart key technology comes with certain risks. With the right equipment (in some cases costing only about $20) it is possible to capture the wireless signal from a smart key and play the captured signal back as a spoofed signal which may be improperly used as an access credential by a person who should not have the access credential. Bad actors such as thieves may use electronic devices to relay a wireless signal of a smart key (commonly referred to as a relay or man-in-the-middle attack), tricking an access control system (e.g., a car's anti-theft system) into recognizing a spoofed access credential even when the authorized user (e.g., the car's owner) or the authentic smart key are not present, thereby gaining surreptitious or unauthorized access to an access-controlled area. For example, a spoofed access credential may be used to open, and even start, a car; access an access-controlled building; or the like. Such a so-called relay attack is not merely a research experiment. It poses a serious threat to the security of access-controlled areas, such as potentially millions of cars, schools, offices, prisons, and the like. The global vehicle security system market by value is projected to reach $10.75 billion by 2021. The global automotive smart key market is expected to grow at a compound annual growth rate of approximately 7% during the period 2019 to 2024. Smart key systems are estimated to dominate the vehicle security system market, in terms of value. Smart key systems are increasingly a target for bad actors such as car thieves. There is a need for improved smart key systems that are resistant to spoofing attacks, while still providing users the convenience of touch-free access to access-controlled areas such as cars, homes, offices, schools, and the like.

BRIEF SUMMARY

The present disclosure relates to methods for controlling access to an access-controlled area. In one implementation, the method includes receiving a signal generated by a user device; extracting, with a processing element, a feature of the signal; generating, with the processing element, a device fingerprint using the extracted feature; storing the device fingerprint; and storing the device fingerprint to pair the user device to the access-controlled area. In some implementations, extracting the feature includes analyzing the signal in the time domain. In some implementations, extracting the feature includes analyzing the signal in the frequency domain. The feature may be based on a manufacturing variation of a component of the user device. The manufacturing variation may include a variation in an electro-mechanical structure of a motion sensor. The variation in the electro-mechanical structure may cause a change in a sensed capacitance of the motion sensor. In some implementations, the sensed capacitance may cause a change in a sensed acceleration of the user device. In some implementations, the sensed capacitance may cause a change in a sensed Coriolis force of the user device. In some implementations, the manufacturing variation may include a clock skew of a wireless transmitter.

The method may include receiving a second signal generated by the user device, wherein the second signal includes an access credential to access the access-controlled area; extracting, with the processing element, a feature of the second signal; generating, with the processing element, a second device fingerprint using the extracted feature of the second signal; retrieving, with the processing element, the device fingerprint; and comparing, with the processing element, the second device fingerprint to the device fingerprint; and authenticating, with the processing element, the access credential received based on the comparison of the device fingerprint and the second device fingerprint.

In some implementations, generating the device fingerprint includes training an artificial intelligence algorithm using the extracted feature. In some implementations, comparing the second device fingerprint to the device fingerprint includes using an artificial intelligence algorithm to compare the device fingerprint to the second device fingerprint.

A system for controlling access to an access-controlled area is disclosed. In one implementation, the system includes a user device that generates a signal. The user device has a device fingerprint based on a feature in the signal that uniquely identifies the user device; the user device transmits an access credential to the access-controlled area; the access controlled area includes a processing element that compares the device fingerprint to an approved device fingerprint for the user device and authenticates the access credential based on the comparison of the device fingerprint to the approved device fingerprint to allow access to the access-controlled area.

BRIEF DESCRIPTION OF THE SEVERAL VIEWS OF THE DRAWINGS

FIG. 6 is a table listing examples of features that may be extracted from a signal of a user device to generate a device fingerprint.

DETAILED DESCRIPTION

Figure 1:
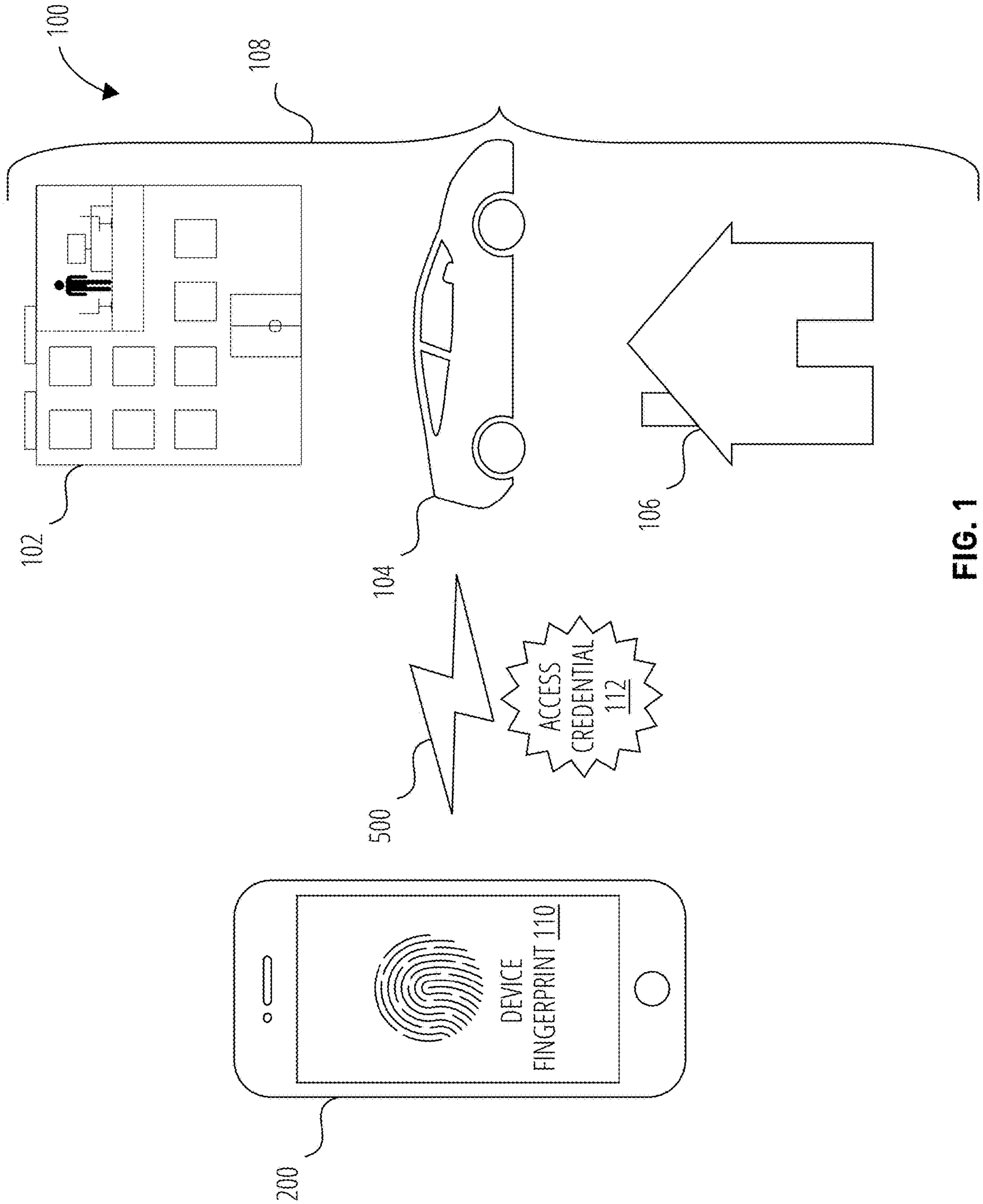
FIG. 1 illustrates a simplified schematic of a device fingerprint smart key system suitable to access an access-controlled area.

The present disclosure is directed to methods and systems of a spoof-resistant smart key. "Smart key" refers to a user device that can transmit an access credential to an access-controlled area to permit access to, or operation of, the access-controlled area. In some implementations, the smart key may be a circuit, processing element, or other hardware on a user device, where the user device also has other functions. In some implementations, the smart key may be a set of computer instructions stored in a non-transitory memory that when executed by a processing element, cause a user device to transmit an access credential. “Access-controlled area” refers to any area or device to which access and/or when a device, operation of the device, is restricted through the use of an access credential. “Access credential” refers to any transmission, data, code, or other information that can identify a device suitable to permit access to an access-controlled area. In some implementations, an access credential may be a rolling, encrypted, and/or time varying code. “User device” refers to any type of computing device that can transmit and receive data from another computing device. For example, the user device may be a smartphone, tablet computer, wearable device, laptop, desktop, server, key fob, and the like. In many embodiments, the user device is a portable device.

Smart keys may be provided by user devices such as mobile devices like phones, tablet computers, laptops, smart watches, wearable devices, exercise monitors, key fobs, identification badges, etc. Electronic devices may exhibit variations in those signals. For example, slight variances in manufacturing tolerances may produce variations in signals emitted by two different electronic devices of the same model made in the same factory. In some examples, the manufacturing variations may include slight gap differences between the electrodes for motion sensors in two different devices. For example, a user device such as a smart phone may include an motion sensor such as inertial sensors like an accelerometer or gyroscope. For example, small differences in the accelerometers between two different phones of the same model may cause a difference in the generated capacitance for the same acceleration detected by the accelerometers in the two phones. In some examples, imperfections in the electro-mechanical structure of a processing element or sensor may cause a difference in the generated capacitance for the same Coriolis force sensed by a sensor. In another example, a clock skew of a wireless transmitter (e.g., a near field communications (NFC) transmitter, Wi-Fi transmitter, Bluetooth transmitter, or the like) may be different between two different user devices.

Signals from a user device may be captured and analyzed to determine variations in the signals. Features of the signals may be extracted to generate a fingerprint for the user device. For example, a captured signal may be analyzed in the time domain to extract features such as mean values, standard deviation, skewness, kurtosis, root mean square values, extrema (e.g., maxima and minima), short term zero crossing rate (“ZCR”), counts of non-negative values, and the like. Similarly, captured signals may be converted to the frequency domain via suitable techniques. Some examples of suitable techniques include Fourier series, Fourier transform, fast Fourier transform, Laplace transform, Z transform, wavelet transform, and the like. In the frequency domain, features may be extracted, such a spectral centroid, spectral spread, spectral skewness, spectral kurtosis, spectral flatness, spectral irregularity, spectral entropy, spectral rolloff, spectral brightness, spectral RMS, or spectral roughness.

Features extracted from the time domain and/or frequency domain may be used to generate a fingerprint for a user device. The fingerprint may be rare, or in some cases, unique such that the fingerprint may not be reproduced by another electronic device, even an electronic device of the same model and/or made on the same assembly line. Thus, by generating a device fingerprint and using the device fingerprint to authenticate a wireless access credential, attacks against smart key systems such as spoof or relay attacks may be thwarted. “Device fingerprint” refers to a rare, or in some cases unique, feature or set of features present in the time and/or frequency domains of a signal generated by a user device.

The systems and methods of the present disclosure, (i.e., device fingerprint smart keys and related systems and methods) may have certain advantages. “Device fingerprint smart key” refers to a smart key configured to use a device fingerprint. For example, smart keys according to the present disclosure may be developed with low additional cost, by using existing hardware. Device fingerprint smart keys may have low computational overhead which can increase battery life and device responsiveness. Device fingerprint smart keys may increase security by thwarting attacks on smart key systems. Device fingerprint smart keys may provide transparency from the user’s perspective in that such a smart key may appear to a user to act similarly to a traditional smart key while providing the enhanced security of a device fingerprint. Furthermore, a device fingerprint smart key may improve security without resorting to the use of personal biometric data of users such as actual fingerprints, retinal scans, facial scans, or the like, which can present both privacy and security challenges.

FIG. 1 shows a schematic of a device fingerprint smart key system 100. The device fingerprint smart key system 100 includes a user device 200 in signal 500 and one or more access-controlled areas 108. In various non-limiting examples, the access-controlled areas 108 may be a building 102, a vehicle 104, a house 106, a transit terminal, amusement park, or any other area, building or device for which access and/or use may be restricted to authorized persons. The user device 200 may be a smart key or may execute a smart key application (e.g., an app). The user device 200 communicates wirelessly with the access-controlled area to transmit an access credential 112 and provide access to the access controlled area.

For example, in one implementation, when the access-controlled area is a vehicle 104, the user device 200 may include dedicated hardware such as a processor and/or software that when activated transmits an access credential 112 to the vehicle 104. For example, when a user touches a portion of the vehicle 104 like a door handle, the vehicle 104 may transmit a signal 500 that may be received by the smart key. The smart key may respond with an access credential 112 transmitted on a second signal 500. The access credential 112 may be received by the vehicle 104 and the vehicle 104 may unlock a door. Similarly, when a user enters the vehicle 104 and presses a start button to enable operation of the vehicle, the vehicle 104 may transmit a signal 500 that may be received by the user device 200. The user device 200 may respond with an access credential 112 transmitted by a signal 500. The vehicle 104 may receive the access credential 112 and may disable an immobilizer system on the vehicle 104 and start the engine or motor, unlock a steering wheel, and/or otherwise enable the vehicle 104 to be driven. In another example, signal 500 between the user device 200 and the vehicle 104 may be initiated by the user device 200 rather than the vehicle 104. For example, a user may press a button (either a physical button or a soft button such as an icon on a user interface) on the user device 200 that transmits a signal 500 including an access credential 112.

The access credential 112 may be received by the vehicle 104 which may then unlock, disable the immobilizer, start, and/or perform other functions. In some implementations, the signal 500 from a user device 200 to an access-controlled area may occur at one frequency (e.g., 433 MHZ) while signal 500 from the access-controlled area to the user device 200 may occur at a second frequency (e.g., 125 kHZ) different than the first frequency.

Similarly, when an access-controlled area is a building or area like an office, school, home, prison, transit station, amusement park, or the like, an access point at an entry point (e.g., door, gate, elevator, turnstile, etc.) may communicate with the user device 200 similarly to as described above with respect to a vehicle 104.

A signal 500 may be any suitable type of signal and/or any suitable data protocol. For example, a signal 500 may be a wireless signal such as Bluetooth, Wi-Fi, Wi-Max, near field communications ("NFC"), radio frequency identification ("RFID"), or the like. The signal 500 may be any suitable wavelength of electromagnetic radiation including radio, infrared, visible light, ultraviolet light, microwaves, combinations of these, or the like. In many implementations, the frequency may be 2.45 GHz (e.g., as used in Bluetooth). In some implementations, the frequency of the signal 500 may be 315 MHz (e.g., as used in smart keys for vehicles made by North American manufacturers), 422.92 MHz (e.g., as used in smart keys for vehicles made by European and Japanese manufacturers), and/or 2.4 or 5 GHz (e.g., as used in Wi-Fi), or other suitable frequencies.

Figure 2:
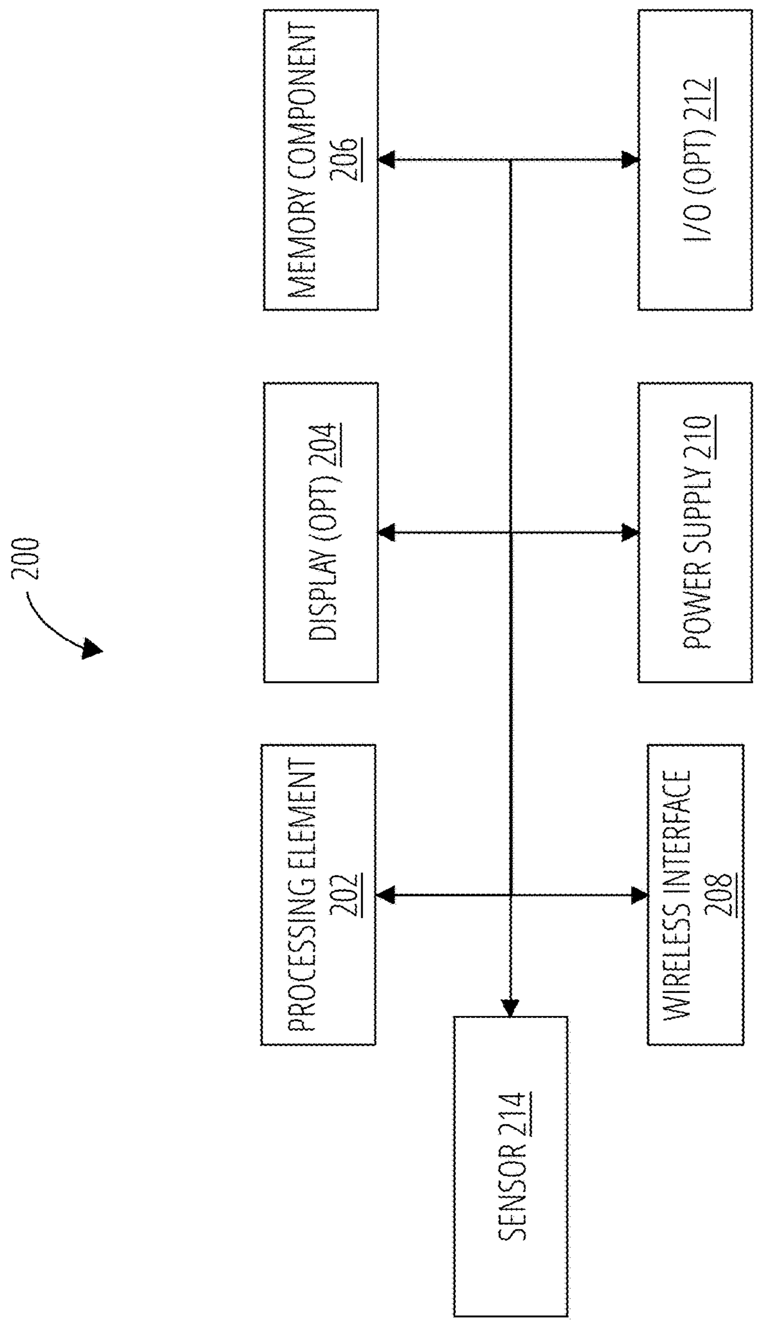
FIG. 2 is a block diagram of components of a user device or an access-controlled area.

FIG. 2 illustrates a simplified block diagram for the various devices of the device fingerprint smart key system 100 including the user device 200. One or more of the access-controlled areas 108 such as the building 102, vehicle 104, and/or house 106 may include similar components. As shown, the various devices may include one or more processing elements 202, an optional display 204, one or more memory components 206, a wireless interface 208, optional power supply 210, and an optional input/output I/O interface 212, and/or an optional sensor 214 where the various components may be in direct or indirect communication with one another, such as via one or more system buses, contract traces, wiring, or via wireless mechanisms.

The one or more processing elements 202 may be substantially any electronic device capable of processing, receiving, and/or transmitting instructions. For example, the processing elements 202 may be a microprocessor, microcomputer, graphics processing unit, or the like. It also should be noted that the processing elements 202 may include one or more processing elements or modules that may or may not be in communication with one another. For example, a first processing element may control a first set of components of the computing device and a second processing element may control a second set of components of the computing device where the first and second processing elements may or may not be in communication with each other. Relatedly, the processing elements may be configured to execute one or more instructions in parallel locally, and/or across a network, such as through cloud computing resources.

The display 204 is optional and provides an input/output mechanism for devices of the device fingerprint smart key system 100, such as to display visual information (e.g., images, graphical user interfaces, videos, notifications, and the like) to a user, and in certain instances may also act to receive user input (e.g., via a touch screen or the like). The display may be an LCD screen, plasma screen, LED screen, an organic LED screen, or the like. The type and number of displays may vary with the type of devices (e.g., smartphone versus a desktop computer).

The memory components 206 store electronic data that may be utilized by the computing devices, such as audio files, video files, document files, programming instructions, application files or code, and the like. The memory components 206 may be, for example, non-volatile storage, a magnetic storage medium, optical storage medium, magneto-optical storage medium, read only memory, random access memory, erasable programmable memory, flash memory, or a combination of one or more types of memory components. In many embodiments, the access-controlled areas 108 may have a larger memory capacity than the user devices 200, with the memory components optionally linked via a network or the like.

The wireless interface 208 receives and transmits data to and from the various devices of the device fingerprint smart key system 100, such as the user device 200 and/or an access-controlled area 108. The wireless interface 208 may transmit and send data to another device directly or indirectly. For example, the wireless interface 208 may transmit data to and from other computing devices via direct signal 500 with those devices. In other implementations, the wireless interface 208 may transmit data from one device of the device fingerprint smart key system 100 to another device of the device fingerprint smart key system 100 through a network. In some embodiments, the network wireless interface 208 may also include various modules, such as an application program interface (API), that interface and translate requests between devices or across a network.

The sensor 214 may be any type of suitable sensor, such as a motion sensor like an accelerometer or gyroscope, a light sensor, proximity sensor, microphone, shock sensor, touch sensor, a magnetometer, a global positioning system sensor, a human fingerprint sensor (not to be confused with a device fingerprint as disclosed herein), a pedometer, a machine code reader such as a quick response QR or barcode reader, a camera, a barometer, an altimeter, a heart rate sensor, a thermometer, a humidity sensor, a Geiger counter, or the like. A sensor may be optional in an access point of an access-controlled area 108.

The various devices of the device fingerprint smart key system 100 may also include a power supply 210. The power supply 210 provides power to various components of the user device 200 and/or the access-controlled areas 108. The power supply 210 may include one or more rechargeable, disposable, or hardwire sources, e.g., batteries, power cord, AC/DC inverter, DC/DC converter, or the like. Additionally, the power supply 210 may include one or more types of connectors or components that provide different types of power to the user device 200 and or the access-controlled areas 108. In some embodiments, the power supply 210 may include a connector (such as a universal serial bus) that provides power to the computer or batteries within the device and also transmits data to and from the device to other devices.

The I/O interface 212 allows the device fingerprint smart key system 100 devices to receive input from a user and provide output to a user. In some devices, for instance a user device 200 like a key fob, the I/O interface may be optional. In some implementations, the I/O interface 212 may only include an input (e.g., a button) and no output (e.g., a smart key fob with buttons to lock, unlock doors of a car, or cause the car to sound a panic alarm, or the like). In some implementations, the I/O interface 212 may include a capacitive touch screen, keyboard, mouse, stylus, or the like.

The type of devices that interact via the input/output I/O interface 212 may be varied as desired.

Figure 3:
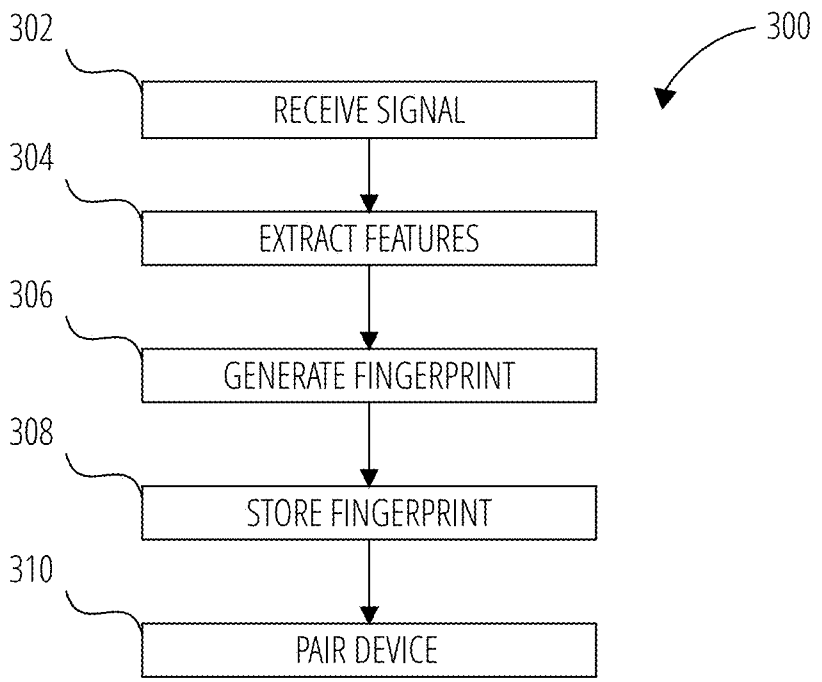
FIG. 3 is a method of generating a device fingerprint for a user device.

FIG. 3 is a simplified block diagram of a method of determining a device fingerprint 110 for a user device 200. For example, the method 300 may be used to pair a particular user device 200 with a particular access-controlled area 108, such that the access-controlled area 108 will authenticate an access credential 112 received from the user device 200 against the device fingerprint 110 prior to granting access.

The method 300 may begin in operation 302 and a processing element 202 receives a signal 500 from a user device 200. The signal 500 may be generated by any sensor 214 associated with the user device 200. The sensor signal may be encoded in a wireless signal 500 transmitted by the wireless interface 208 of the user device 200. An example of a time-domain representation of a signal 500 is shown for example in FIG. 5. The signal 500 may be received by a wireless interface 208 of a device associated with an access-controlled area 108, such as an access point, or another device, such as a setup device.

The method 300 may proceed to operation 304 and a processing element 202 extracts one or more features of the signal 500. The signal 500 received in operation 302 may be converted into a representation that may be stored in a memory component 206. The signal 500 may be stored as a time domain representation, and/or may be converted to a frequency domain representation. Examples of features that may be extracted are discussed herein with respect to FIG. 5 and FIG. 6. The features of the signal may be rare, or in some cases unique to the signal 500. For example, the features may be unique to one or more sensors 214 associated with the user device 200. For example, as discussed, the signal 500 may include certain features caused by manufacturing variations in the user device 200 (e.g., variations between similar sensors of two different devices) that may not be re-producible on another device.

The method 300 may proceed to the operation 306 and a processing element 202 generates a device fingerprint 110 from the one or more features extracted in the operation 304. In some implementations, the device fingerprint 110 may be based on one extracted feature. However, in many implementations, more than one feature may be combined to generate the device fingerprint 110. Combining features of the signal 500 to generate the device fingerprint 110 may have additional security advantages. For example, the more features that are used to generate the device fingerprint, the less likely it is that another device from the user device 200 for which the device fingerprint 110 is being generated may have a same or similar device fingerprint.

In many implementations, the fingerprint may be generated by an artificial intelligence algorithm such as a pattern matching, machine learning, and/or pattern classifying algorithm (collectively "AI") executing on a processing element. Presented with one or more extracted features, the AI can generate a fingerprint based on the pattern of extracted features. In one example, the AI may be trained with one or more features extracted from in operation 304. The AI may adapt based on the extracted features. For example, where the AI is an artificial neural network like a multi-layer perceptron, the weightings given to certain neurons or layers in the network may be increased or decreased based on the extracted features, such that when the AI encounters extracted features of the used device 200 again (e.g., as discussed below with respect to the method 400), the AI may recognize the device fingerprint 110 of the device 200. The AI may be able to detect features in the signal 500 that may be unique to the particular user device 200 sending the signal 500.

The method 300 may proceed to the operation 308 and the device fingerprint 110 is stored in a memory component 206 for later use. In many implementations, the device fingerprint 110 may be stored in a memory component 206 associated with the access-controlled area. For example, the device fingerprint 110 may be stored in a memory of a device such as an access point for the access-controlled area, or a memory accessible to such an access point (e.g., a security server). In many implementations, the fingerprint may be stored in a memory associated with a vehicle 104, such as a memory associated with a security or immobilization system of the vehicle 104. The stored device fingerprint 110 may be retrieved as discussed below when the user device 200 is used to access an access-controlled area 108.

The method 300 may proceed to the operation 310 and the user device 200 is paired with the access-controlled area 108. The access-controlled area 108 may recognize the user device 200 as a trusted device and may compare a device fingerprint 110 received from the user device 200 against the stored device fingerprint 110 to authenticate an access credential 112, thereby thwarting attacks on the device fingerprint smart key system 100 (e.g., as discussed in more detail with respect to method 400). For example, when the access-controlled area 108 is a vehicle 104, the user device 200 may be recognized by the user device 200 as a paired or trusted user device 200 for which a device fingerprint 110 is known and can be used to authenticate access credentials received from the user device 200.

In one specific example of the method 300, a user may pair a user device 200 such as a smart phone to act as a smart key. For example, the user may place either or both the user device 200 and/or the vehicle 104 in a learning mode. In operation 302 the user device 200 may send one or more test or calibration signals 500 to the vehicle 104. The calibration signals may include information from one or more sensor 214 associated with the user device 200, such as a motion sensor like an accelerometer or gyroscope. The vehicle 104 may perform operation 304, operation 306, and/or operation 308 on the signal 500, extracting features, generating the device fingerprint, and storing the device fingerprint. For example, the training signals may be used to train an AI such as a pattern recognition/classification algorithm to recognize the particular user device 200. In another implementation, the user device 200 may determine its own device fingerprint and send the same to the vehicle 104 for storage thereon. Either the user device 200 or the vehicle 104 may store information related to the other of the user device 200 or vehicle 104, such as a user device 200 or vehicle 104 identifier, serial number, or the like to be used with the device fingerprint.

Figure 4:
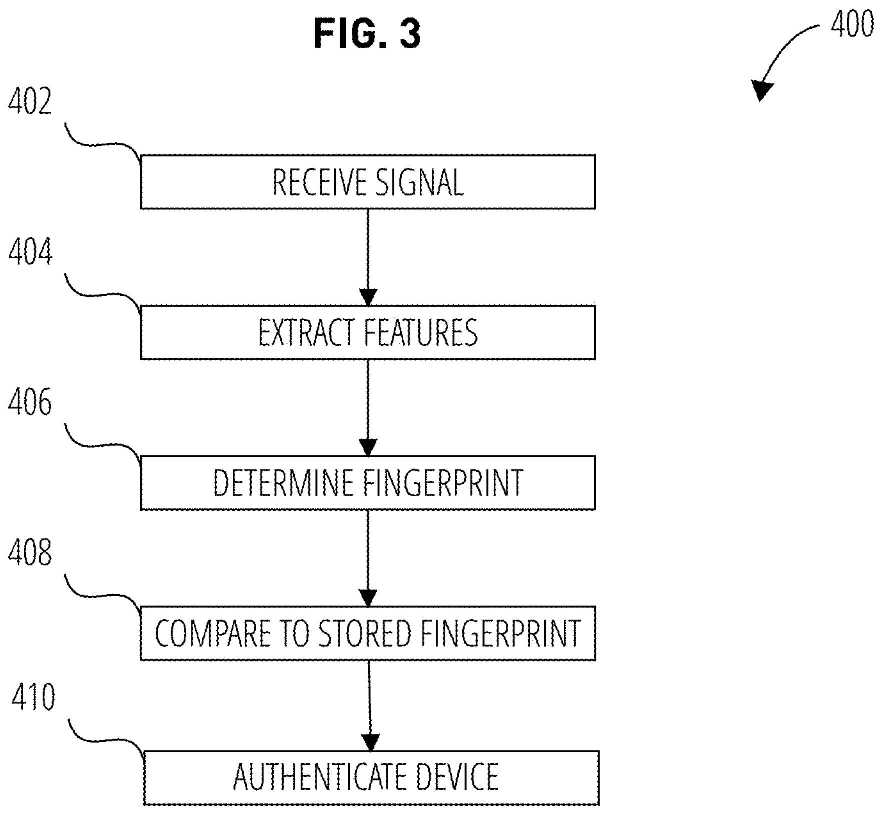
FIG. 4 is a method of using a device fingerprint for a user device to access an access-controlled area.

FIG. 4 illustrates a method 400 of accessing an access-controlled area 108 using a device fingerprint smart key. The method 400 may begin in operation 402 and the access-controlled area 108 receives a signal 500 from a user device 200 that was previously paired with the access-controlled area 108 as in method 300. The signal 500 may be generated and transmitted by the user device 200 in response to a signal 500 from the access-controlled area 108. For example, when a user touches a button or door handle of a vehicle 104, the vehicle 104 may send a signal 500 that queries nearby user devices 200 for an access credential 112. The user device 200 may respond by sending a signal 500 including the access credential 112. Provided the user device 200 was previously paired with the access-controlled area 108, the signal 500 should include the same features that were extracted in the method 300 to pair the user device 200 with the access-controlled area 108.

The method 400 may proceed to the operation 404 and the features of the signal 500 are extracted by a processing element 202. The operation 404 may use the same techniques as the operation 304, which are not repeated here, for the sake of brevity.

The method 400 may proceed to operation 406 and the device fingerprint 110 for the user device 200 may be determined. The operation 406 may proceed similarly to the operation 306. For example, the one or more features of the signal 500 extracted in operation 404 may be presented to an AI which may determine a pattern associated with the one or more features and generate a device fingerprint 110 associated with the device 200.

The method 400 may proceed to the operation 408 and a processing element 202 compares the device fingerprint 110 generated in operation 406 to the stored device fingerprint 110 generated in the operation 306 and stored in the operation 308. If the current device fingerprint 110 matches, or is similar within a threshold to, the stored device fingerprint, the access-controlled area 108 may authenticate the access credential and allow access to the access-controlled area 108. For example, when the AI was trained in the method 300 to recognize the device fingerprint 110 of a particular device 200, the AI may rely on that training data (e.g., the fingerprint generated in operation 306) to determine whether the features extracted in operation 404 form a device fingerprint 110 that matches, to within a threshold, the device fingerprint generated in operation 306 and stored in operation 308.

The method 400 may proceed to operation 410. If the fingerprint determined in operation 406 is similar to within a threshold compared to the stored fingerprint, the access credential 112 received from the user device 200, and/or the user device 200 itself, is authenticated. When the device 200 and/or access credential are authenticated, access to, or operation of, the access-controlled area may be granted. The comparison between the stored fingerprint and the fingerprint determined in operation 406 may be considered to be from the same device 200 if the fingerprints are similar to one another within a threshold i.e., an exact match is not required.

Figure 5:
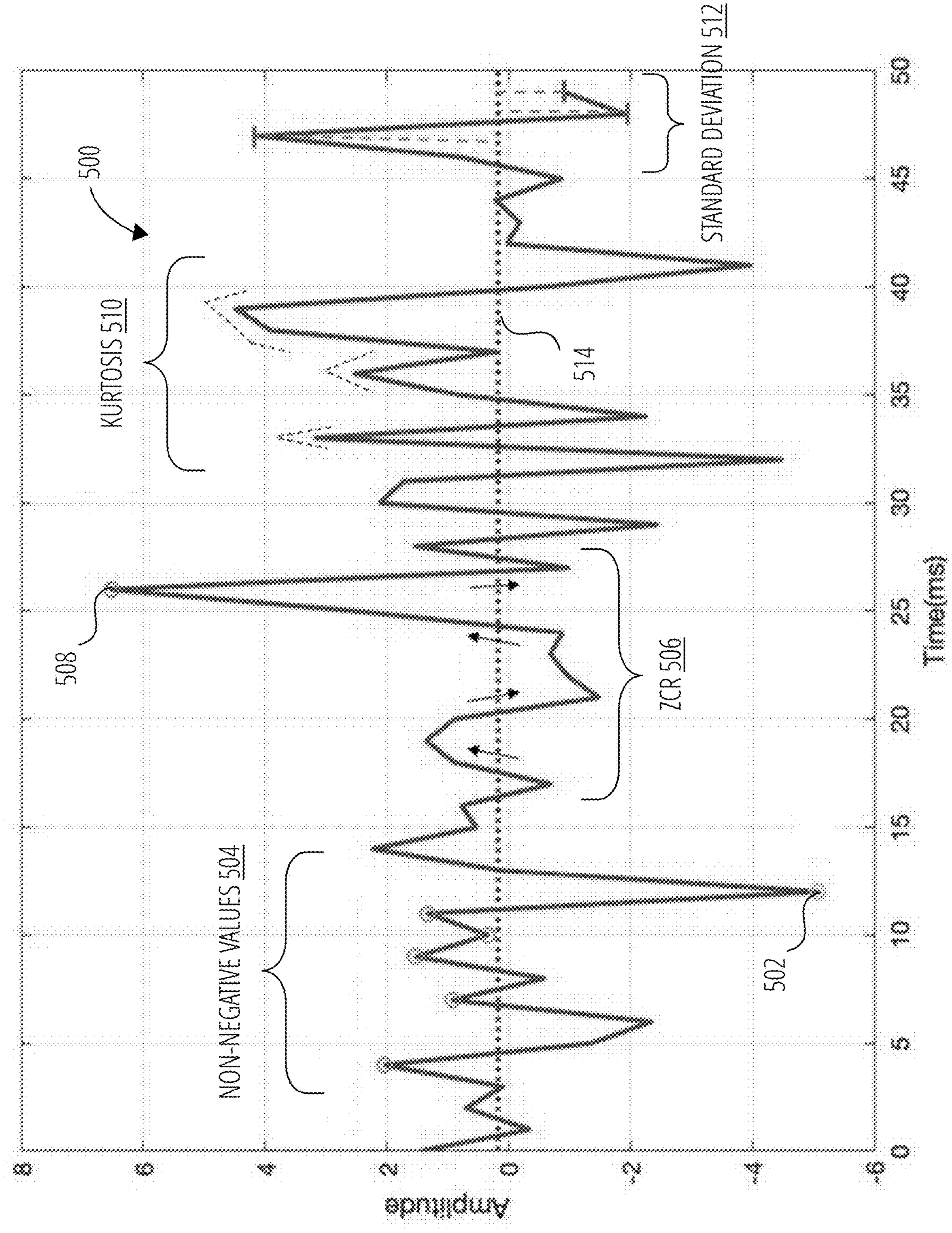
FIG. 5 is an example of a signal generated by a user device in the time domain.

FIG. 5 illustrates non-limiting examples of features of a signal 500 that may be extracted as in method 300 and/or method 400. For example, the signal 500 may have an amplitude or signal strength, such as measured in an electric potential, decibels, or other suitable measure. The amplitude may have positive and/or negative values relative to a neutral point (shown a 0 on the y-axis of FIG. 5). The signal 500 shown for example in FIG. 5 includes a time scale in milliseconds. Other signals 500 may have other time scales as appropriate for the signal.

One example of a feature that may be extracted from a signal 500 is one or more non-negative values 504. The non-negative values 504 may be values of the amplitude at or above the neutral point. Other examples of features that may be extracted from a signal 500 are extrema such as a minimum 502 and/or a maximum 508. These extrema may be either global extrema over the entire length of a signal 500 or they may be local extrema at certain points of the signal 500. Another example of a feature that may be extracted from a signal 500 may be a Short Term Zero Crossing Rate (ZCR) 506. The Short Term Zero Crossing Rate (ZCR) 506 may be a series of instances of the signal 500 crossing the neutral amplitude in a given time. Another example of a feature that may be extracted from a signal 500 is kurtosis 510. Kurtosis 510 is a measure of the flatness of spikiness of a distribution of the amplitude of the signal 500. Likewise skewness may measure the asymmetry of the values of the amplitude of the signal 500 about a median of a normal distribution. Another example of a feature that may be extracted from a signal 500 is the standard deviation of the amplitude of the signal 500. Additionally, features such as mean signal value, signal variance, RMS energy, low energy rate, or the like may be used. Additional examples are described in A. Das, et al., "Exploring Ways To Mitigate Sensor-Based Smartphone Fingerprinting" (2015) which is incorporated herein by reference and describes methods of eliminating or obfuscating a device fingerprint, in contrast to the present disclosure which uses a device fingerprint 110 to improve security.

FIG. 6 lists time domain features which may be extracted from the signal 500 as discussed with respect to FIG. 5. FIG. 6 also lists examples of features which may be extracted from a signal 500 in the frequency domain such as spectral centroid, spectral spread, spectral skewness, spectral kurtosis, spectral flatness, spectral irregularity, spectral entropy, spectral rolloff, spectral brightness, spectral RMS, or spectral roughness.

Figure 7A:
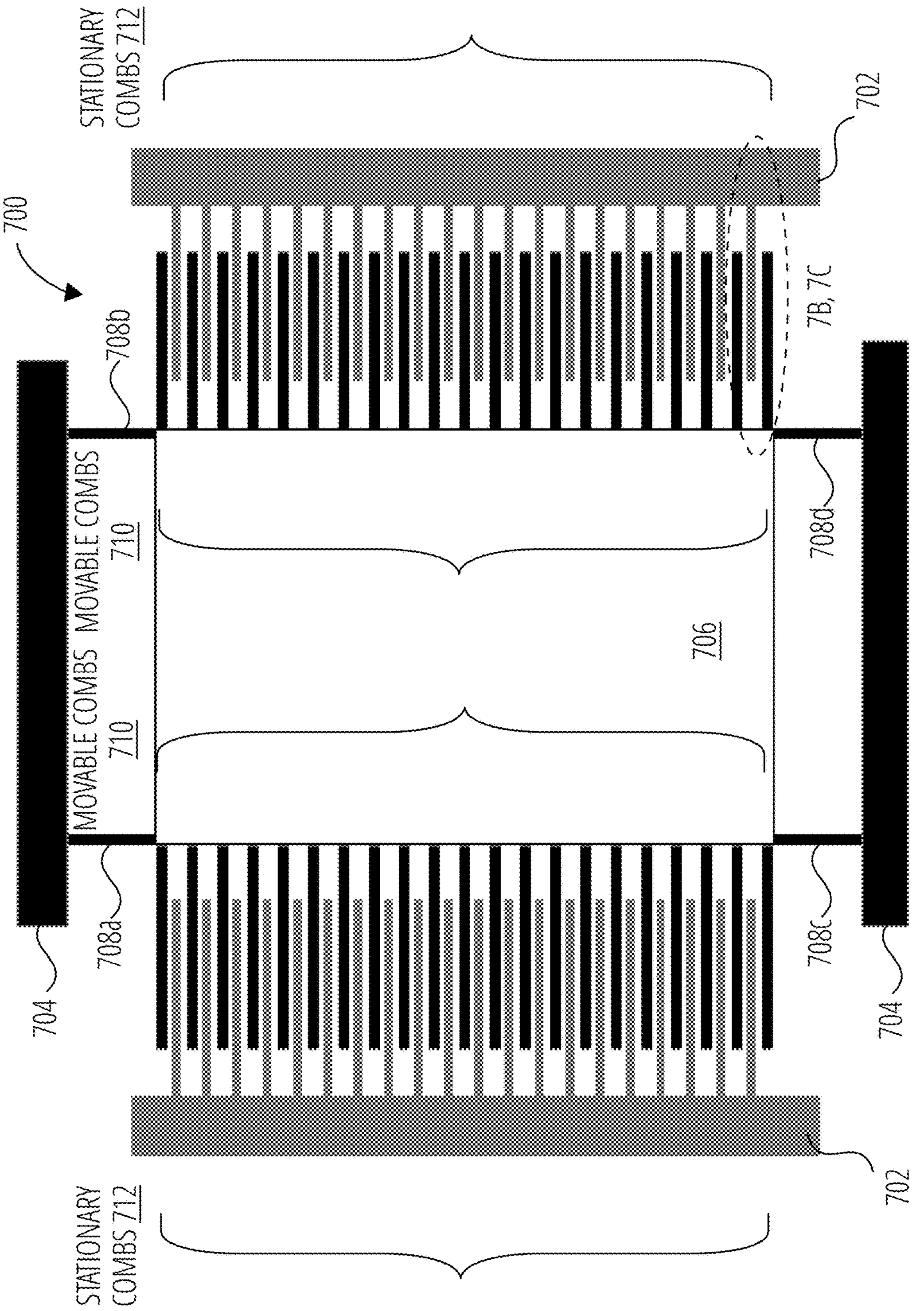
FIG. 7A is a simplified schematic of a motion sensor.
Figure 7B:
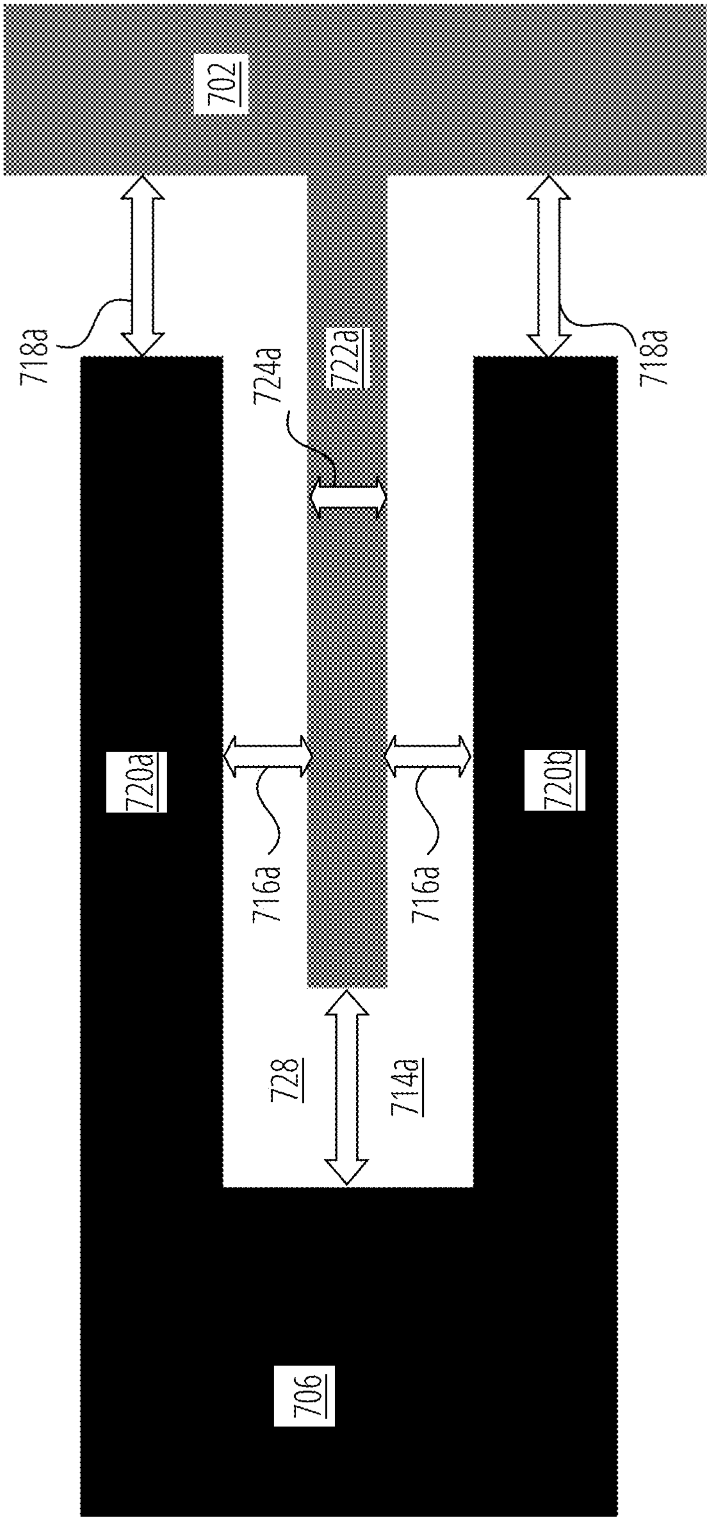
FIG. 7B is a detailed view of the motion sensor of FIG. 7A taken along detail line 7A, 7B of FIG. 7A.
Figure 7C:
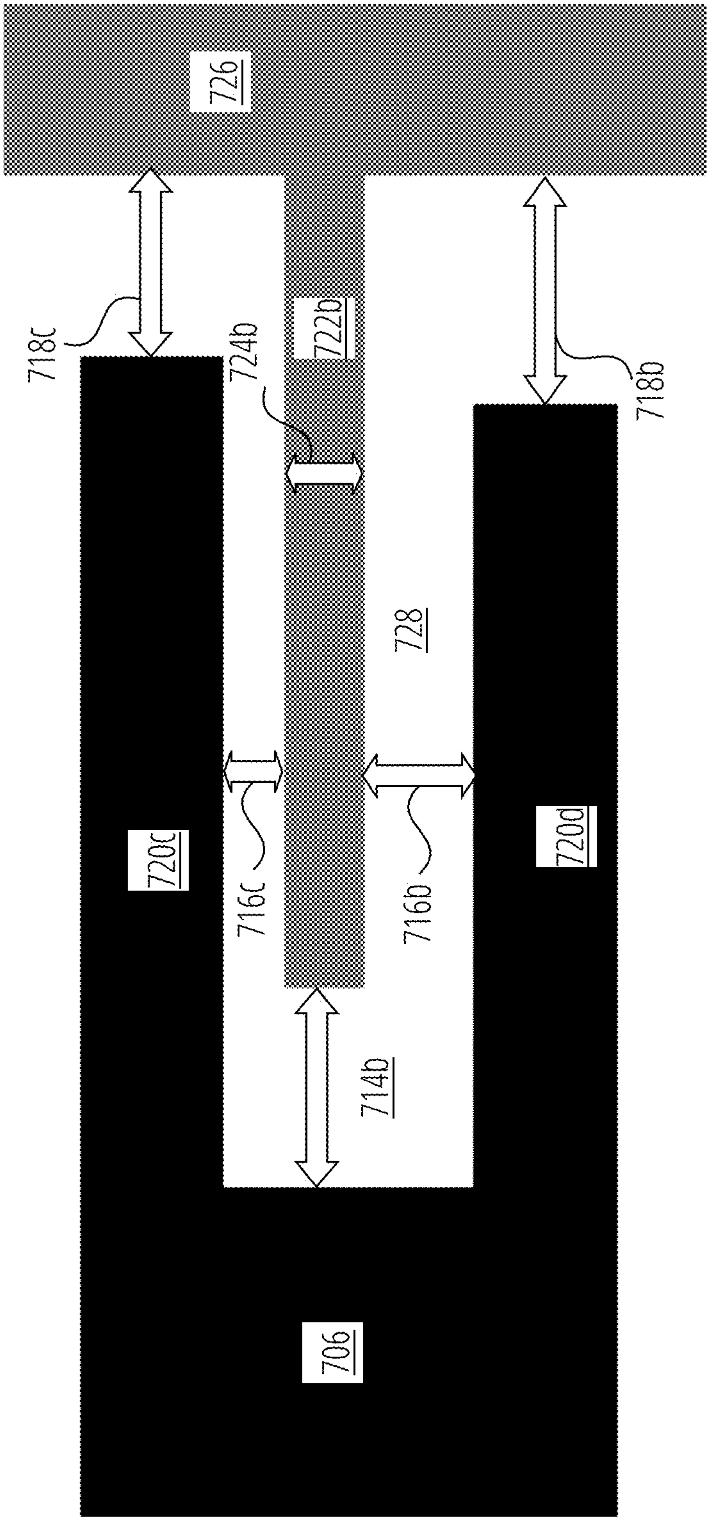
FIG. 7C is a detailed view of the motion sensor of FIG. 7A showing examples of manufacturing variations, taken along detail line 7A, 7B of FIG. 7A.

FIG. 7A-FIG. 7C are simplified schematics of a motion sensor 700 such as a sensor 214. In the example shown, the motion sensor 700 is an example of a micro-electromechanical capacitance sensor used to measure acceleration. Minute manufacturing variations between motion sensors 700, even motion sensors 700 etched from the same silicon wafer, may give rise to features which may be extracted from a signal 500 to develop a device fingerprint 110 as disclosed herein.

The motion sensor 700 includes a first electrode 702 and a second electrode 704. One of the electrodes is charged at an electric potential relative to the other one such that a capacitance may be measured between the first electrode 702 and the second electrode 704. In such a capacitor the capacitance may be described by $$C = \varepsilon\frac{A}{d},$$

where C is the capacitance, is the permittivity of the dielectric material 728 between the first electrode 702 and the second electrode 704 (usually a gas such as air), d is the distance 716*a* between the first electrode 702 and the second electrode 704, and A is the area between the first electrode 702 and the second electrode 704. Each of the first electrode 702 and the second electrode 704 include a plurality of combs interlaced with one another to boost the amount of capacitance per the above equation. The combs of the first electrode 702 are stationary combs 712. The second electrode 704 includes a proof mass 706 suspended to the second electrode 704 by one or more flexible supports 708*a*-flexible supports 708*c*. The combs of the second electrode 704 are attached to the proof mass 706 and are movable combs 710.

As the motion sensor 700 is subjected to accelerations, the proof mass 706 moves, changing the amount of interleaving of the movable combs 710 and movable combs 710 with the stationary combs 712 and stationary combs 712. As the interleaving changes, the area A between the sets of combs changes, thus changing the capacitance, which can be measured at the first electrodes 702 and second electrode 704 such as by a processing element 202 to generate a motion signal. As the combs move, the distance between the combs may change as well, also affecting the capacitance. See, for example the stationary comb end gap 714*a* and movable comb end gap 718*a* of FIG. 7B or the stationary comb end gap 714*b*, movable comb end gap 718*b*, and movable comb end gap 718*c* of FIG. 7C. Also, if the combs are not parallel to one another, the distance between the combs may change as the movable combs 710 move relative to the stationary combs 712.

FIG. 7B shows an ideal representation of the motion sensor 700 of FIG. 7A. In FIG. 7B, the stationary comb 722*a* is placed equidistant from the movable comb 720*a* and the movable comb 720*b* by a distance 716*a*. The end of the stationary comb 722*a* is a stationary comb end gap 714*a* from the proof mass 706. Likewise, the movable comb end gap 718*a* of the movable comb 720*a* and the movable comb 720*b* are a uniform movable comb end gap 718*a* from the first electrode 702.

A more realistic representation of the motion sensor 700 is shown in FIG. 7C showing examples of manufacturing variations that may occur from motion sensor to motion sensor, even within the same silicon wafer. Such variations may give rise to features that may be extracted from a motion signal or from a signal 500 to generate a device fingerprint. In FIG. 7C, the stationary comb 722*b* is a first electrodes end gap 714*b* from the proof mass. The stationary comb 722*b* is not equidistant between the movable comb 720*c* and movable comb 720*d*, rather the stationary comb 722*b* is separated from the movable comb 720*c* by a side gap 716*c* and from the movable comb 720*d* by a side gap 716*b*. The side gap 716*b* may not be the same as the side gap 716*c*. For example, as shown, the side gap 716*b* is greater than the side gap 716*c*. In the example shown, the movable comb 720*d* is shorter than the movable comb 720*c*. Therefore the movable comb end gap 718*c* separating the movable comb 720*c* from the electrode 726 is smaller than the movable comb end gap 718*b* separating the movable comb 720*d* from the electrode 726. Any of these dimensions, or other dimensions may vary between motion sensors, giving rise to features that may be extracted from a signal generated by the user device 200, and may be used to generate a device fingerprint.

In some implementations, the user device 200 may include a gyroscope that measures a rate of rotation of the user device 200. The gyroscope may use the Coriolis force to measure the rate of rotation according to the vector cross product relation $F=2m\hat{v}\times\omega$, where m is the mass of a proof mass, $\hat{v}$ is the velocity vector and w is the rate of rotation. The Coriolis force F is perpendicular to both the rotation axis and the velocity of the user device 200. The Coriolis force may be sensed with a similar variable capacitor structure to the motion sensor 700 and may be subject to similar manufacturing variations between sensors that may give rise to features that can be extracted from a signal 500 to generate a device fingerprint.

In one example of a use case of the methods and systems disclosed herein, a user device 200 such as a smart phone may be used as a smart key to access a user's car. For example, the user device 200 may include an application stored in the memory component 206 that when executed by the processing element 202, causes the processing element 202 to generate and transmit a wireless signal including an access credential 112 to a vehicle 104 to unlock and/or operate the vehicle. Without using a device fingerprint 110 as disclosed herein such a system is vulnerable to a relay attack. To mitigate that risk, the user device 200 may be paired with a vehicle 104 for example using the method 300, creating a rare, or in some cases unique, device fingerprint 110 for the user device 200. The vehicle 104 may be accessed and/or operated as in method 400. The vehicle 104 may be configured such that if it receives an access credential but does not receive a signal 500 including the device fingerprint 110 of the user device 200, it may prevent access to, or operation of, the vehicle 104. Similarly, if the vehicle 104 receives a device fingerprint 110 that does not match the device fingerprint 110 of a user device 200 paired with the vehicle 104 as in method 300, it may prevent access to and/or operation of, the vehicle 104. Similar use cases may be used with other access-controlled areas 108 such as buildings 102, houses 106, schools, amusement parks, transit platforms, and the like.

The description of certain embodiments included herein is merely exemplary in nature and is in no way intended to limit the scope of the disclosure or its applications or uses. In the included detailed description of embodiments of the present systems and methods, reference is made to the accompanying drawings which form a part hereof, and which are shown by way of illustration specific to embodiments in which the described systems and methods may be practiced. These embodiments are described in sufficient detail to enable those skilled in the art to practice presently disclosed systems and methods, and it is to be understood that other embodiments may be utilized, and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The included detailed description is therefore not to be taken in a limiting sense, and the scope of the disclosure is defined only by the appended claims.

From the foregoing it will be appreciated that, although specific embodiments of the invention have been described herein for purposes of illustration, various modifications may be made without deviating from the spirit and scope of the invention.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms "a" and "an" are taken to mean "one", "at least one" or "one or more". Unless otherwise required by context, singular terms used herein shall include pluralities and plural terms shall include the singular.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. A method for controlling access to an access-controlled area comprising:

receiving a wireless signal generated and transmitted by a user device;

extracting, with a processing element, features of the wireless signal, wherein the features are based on one or more manufacturing variations of one or more components of the user device;

generating, with the processing element, a device fingerprint based on a pattern of the extracted features;

storing the device fingerprint; and pairing the user device to the access-controlled area.

2. The method of claim 1, wherein extracting the features includes analyzing the signal in the time domain or the frequency domain.

3. The method of claim 1, wherein at least one of the manufacturing variations comprises a variation in an electro-mechanical structure of a motion sensor that causes a change in a sensed capacitance of the motion sensor.

4. The method of claim 3, wherein the change in the sensed capacitance causes a change in a sensed acceleration of the user device or a sensed Coriolis force of the user device.

5. The method of claim 1, wherein the manufacturing variation includes a clock skew of a wireless transmitter.

6. The method of claim 1, wherein the extracted features comprise one or more of a standard deviation, a skewness, a kurtosis, a root mean square values, an extremum, a short term zero crossing rate, or a count of non-negative values.

7. The method of claim 1, wherein the extracted features comprise one of a spectral centroid, a spectral spread, a spectral skewness, a spectral kurtosis, a spectral flatness, a spectral irregularity, a spectral entropy, a spectral rolloff, a spectral brightness, a spectral RMS, or a spectral roughness.

8. The method of claim 1, further comprising:

receiving a second wireless signal generated by the user device, wherein the second wireless signal includes an access credential to access the access-controlled area;

extracting, with the processing element, a feature of the second wireless signal;

generating, with the processing element, a second device fingerprint using the extracted feature of the second wireless signal;

retrieving, with the processing element, the device fingerprint; and comparing, with the processing element, the second device fingerprint to the device fingerprint; and authenticating, with the processing element, the access credential received based on the comparison of the device fingerprint and the second device fingerprint.

9. The method of claim 8, wherein comparing the second device fingerprint to the device fingerprint includes using an artificial intelligence algorithm to compare the device fingerprint to the second device fingerprint, wherein the artificial intelligence algorithm is trained using the extracted features extracted from the wireless signal.

10. The method of claim 1, wherein the user device is a device fingerprint smart key.

11. The method of claim 1, wherein generating the device fingerprint includes training an artificial intelligence algorithm using the extracted features.

12. A system for controlling access to an access-controlled area comprising:

a user device that generates a wireless signal, wherein:

the user device has a device fingerprint generated by extracting a pattern of features from the wireless signal, wherein the pattern of features uniquely identifies the user device based on one or more manufacturing variations of one or more components of the user device;

the user device transmits an access credential to the access-controlled area;

the access controlled area includes a processing element that compares the device fingerprint to an approved device fingerprint for the user device and authenticates the access credential based on the comparison of the device fingerprint to the approved device fingerprint to allow access to the access-controlled area.

13. The system of claim 12, wherein the features of the wireless signal are in the time domain or the frequency domain.

14. The system of claim 12, wherein the features comprise one or more of a standard deviation, a skewness, a kurtosis, a root mean square values, an extremum, a short term zero crossing rate, or a count of non-negative values.

15. The system of claim 12, wherein the features comprise one or more of a spectral centroid, a spectral spread, a spectral skewness, a spectral kurtosis, a spectral flatness, a spectral irregularity, a spectral entropy, a spectral rolloff, a spectral brightness, a spectral RMS, or a spectral roughness.

16. The system of claim 12, wherein at least one of the manufacturing variations comprises a variation in an electro-mechanical structure of a motion sensor.

17. The system of claim 16, wherein the variation in the electro-mechanical structure causes a change in a sensed capacitance of the motion sensor.

* * * * *